United States Patent [19]
Taylor

[11] Patent Number: 5,365,364
[45] Date of Patent: Nov. 15, 1994

[54] OPTICAL SCANNER AND PRINTER

[75] Inventor: William H. Taylor, S. Deerfield, Mass.

[73] Assignee: Kollmorgen Corporation, Simsbury, Conn.

[21] Appl. No.: 805,575

[22] Filed: Dec. 10, 1991

[51] Int. Cl.⁵ .............................................. G02B 26/08
[52] U.S. Cl. .................................. 359/208; 359/203; 359/212; 346/108
[58] Field of Search .............................. 359/196–197, 359/201–203, 212–223, 226, 205, 208, 850; 250/234–236; 346/108, 160; 358/474, 494, 206; 348/203

[56] References Cited

U.S. PATENT DOCUMENTS

| | | | |
|---|---|---|---|
| 4,294,506 | 10/1981 | Hattori | 350/6.8 |
| 4,538,181 | 8/1985 | Taylor | 358/208 |
| 5,015,050 | 5/1991 | Itabashi | 359/217 |
| 5,028,103 | 7/1991 | Fukasawa et al. | 359/217 |

FOREIGN PATENT DOCUMENTS 1494885 9/1967 France .

OTHER PUBLICATIONS

IBM Technical Disclosure Bulletin, vol. 31, No. 7, Dec. 1988, Armonk, NY USA.
Smith, Warren J., *McGraw-Hill, Inc.*; pp. 307–315 (1990) "Modern Optical Engineering: The Design of Optical Systems".
Kessler, David et al., *SPIE Vol. 1079 Hard Copy Output*; pp. 27–35 (1989) "High Resolution Laser Writer".
Taylor, W. H., *Optic News*; pp. 28–29 (Jun. 1988) "Advances in Infrared Optical Design Via Diamond Turning Technology".
Hopkins, Robert E., *Optics News*; pp. 11–16 (Nov. 1987) "Optical System Requirements for Laser Scanning Systems".
Minami, Setsuo et al., *Laser Focus Electro-Optics*; pp. 98–106 (Oct. 1987) "Optical Scanner Design Leads to Commercial Laser Printer Success".
Beiser, Leo, *OpticsNews*; pp. 10–16 (Nov. 1986) "Imaging with Laser Scanners".
Beiser, Leo, *Laser Focus/Electro-Optics*; pp. 88–96 (Feb. 1985) "Laser Scanning and Reading: Developments and Trends".
Jamieson, Thomas H., *SPIE vol. 518 Optical Systems Engineering VI*; pp. 15–21 (1984) "Optical Design of Compact Thermal Scanner".
Taylor, William, *SPIE vol. 518 Optical Systems Engineering IV*; pp. 7–14 (1984) "Characteristics of a New Compact Video Rate Optical Scanner (CVROS)".
Urbach, John C. et al., *Proceedings of the IEEE, vol. 70, No. 6*; pp. 597–618 (1982) "Laser Scanning for Electronic Printing".
Fleischer, J. M. et al., *Laser-Optical System*; pp. 479–483 (Sep. 1977) "Laser-Optical System of the IBM 3800 Printer".

*Primary Examiner*—Loha Ben
*Assistant Examiner*—James Phan
*Attorney, Agent, or Firm*—Morgan & Finnegan

[57] ABSTRACT

An optical system including a scan disc having concave reflectors thereon. As an optical printer, positioned adjacent to the scan disc are a corrector lens, a strip mirror, and a primary mirror. Positioned adjacent to the image plane are a field mirror and a pick-off mirror. Input light is directed onto the scan disc perpendicular to the plane of rotation. When one of the concave reflectors on the rotating scan disc is centered over one end of the strip mirror, the input light is brought to focus and is redirected to the primary mirror by the strip mirror. The primary mirror forms an image of the light spot after passing through the corrector lens. This image is intercepted by a field mirror which forms a final image of the spot. This image is picked out of the incident light beam by a thin pick-off mirror which redirects the light allowing image accessibility. With minor modification the optical system may also function as an optical scanner.

34 Claims, 11 Drawing Sheets

PRIOR ART

OPTICAL SCANNER AND PRINTER

BACKGROUND OF THE INVENTION

This invention relates to high speed optical scanners and printers. More particularly, this invention relates to high speed optical scanners and printers for use with images at near distances.

There are numerous applications for high speed optical scanners and printers including non-impact printing, color imaging, digitizing, phototypesetting, bar code reading, inspection, microscopy, photolithography, PC board generation, halftone and color separation. The manipulation and processing of the digitized data acquired from scanning and stored in mass memory units, and its subsequent printing onto film, xerographic and other media offer numerous opportunities for commercial, industrial and military products.

The various methods utilized for high speed printing and scanning include the rotating polygon, the acousto-optic deflector, the galvanometer, and the holographic deflector. More recently, scanning has also been performed using linear arrays of detectors in a charge coupled device (CCD). For printing, the rotating polygon is the standard against which most deflectors are compared.

Speed and quality of scanned and printed images are two of the scanning industry's basic performance measures. They are interrelated as high image definition is dependent upon small scanning spot size, which yields more scan lines per page and requires more time to scan. Image quality in printed media, however, is affected by additional factors, including the straightness, position repeatability and uniformity of width and spacing. Errors due to these factors are readily detectable to the human eye and, therefore, require high control precision, typically ten percent of the recording dot size (e.g., 1 micrometer for a 10 micrometer dot).

A more subtle defect in image quality is image distortion. This is extremely important in systems requiring high positional accuracy of points within the image. Image distortion arises when the length of the line segment scanned during a fixed period of time differs across the scanned line. This defect is known by various names including F-theta deviation, addressability error, non-linearity, and scan velocity error.

Image spot size is primarily determined by the magnitude of the residual optical aberrations of the system, by the relative aperture size of the image forming optics, and by the wavelength of the light employed. Short wavelengths and large relative apertures yield small spots. The relative aperture size and wavelength of light used depend on the system design. This involves format size, print medium and laser light source characteristics, system size, power, manufacturing costs and various other considerations. Accordingly, systems cannot be compared simply on a dots-per-inch ("dpi") basis.

Spot size growth beyond the theoretically achievable minimum spot size due to aberrations is, on the other hand, a valid performance measure for comparison of systems. Growth in spot size in monochromatic systems arises when the image forming light is spread from its theoretical minimum spot size by spherical aberration, coma, astigmatism and field curvature, and scan defocus.

In color systems, further spot size growth arises from chromatic aberrations. On-axis the color aberration causes symmetrical growth in spot size versus wavelength. This is due to the various wavelengths arriving at different focal planes because the lens focal length varies with wavelength. Off-axis the color aberration is particularly objectionable because the growth in spot size is asymmetrical, being linear in the direction of the scan. Again, this is because the projecting optics image size depends on the focal length which, in turn, depends on the wavelength.

The speed of scanning or printing can be limited by many system factors including sensitivity of the printing medium, intensity of the light source, and the bandwidth of the electronics utilized. Often, the speed of scanning or printing is limited by the maximum speed of the beam deflecting device.

Rotating polygon mirrors are typically used as beam deflectors. See, for example, U.S. Pat. Nos. 5,015,050 and 5,028,103. One reason rotating polygon mirrors are used is that they allow multiple lines to be scanned on each revolution, thereby increasing the line scan rate. A number of lines equal to the number of polygon facets may be scanned or printed in each revolution. The number of polygon facets, however, cannot be increased to achieve higher line rates without penalty.

The polygon facet size must be large enough to accommodate the input scan light beam diameter throughout the scan angle range. Dimensioning the polygon to accommodate the input scan light diameter increases the polygon size. Large polygons, however, are not easily driven at high speed due to the air drag caused by the large surface area. Additionally, the "paddle wheel" effect in pushing the air can create substantial drive system problems in both the bearings and drive motor. Evacuated housings are sometimes used but require special precautions and may suffer from poor reliability. Also, bearing load and residual unbalance increases with larger polygons leading to shorter bearing life.

High speed rotating polygons may also suffer from facet surface deformation, and resultant image deterioration, due to centrifugal force. Polygons may also suffer from scan line position inaccuracy due to facet angle errors. Ideally, each scanned line should exactly overlay the preceding one. Then, if the medium is moved at constant rate, uniformly spaced parallel lines and a straight vertical edge will result. Polygon facet errors, however, cause deviations in line parallelism, line spacing and start-of-line position.

Facet wedge error causes deviation in the plane of the scan and thereby affects the start-of-line position. Facet wedge error is frequently compensated for electronically with a start-of-line photodetector and appropriate synchronization circuity.

Facet pyramid error deviates the line of sight in the cross-scan direction and was a major problem in achieving good scans prior to the introduction of cylindrical and toroidal projection optics. Cylindrical and toroidal projection optics allow good line repeatability to be achieved with polygons manufactured to loose facet angle tolerances. The required lenses, however, are more complex to manufacture and yield poor color performance and non-uniform line width due to focus shifts in the tangential and sagittal focal surfaces.

In order to meet the F-theta condition, a projection lens must incorporate negative distortion in the proper amount and distribution. This imposes a considerable constraint on the lens design since it must also reduce spherical aberration, coma, astigmatism and field curvature. As a consequence, in order to achieve a high level of F-theta correction, a complex lens design involving five elements or more is required. Color correction necessitates additional lens elements and adds to the difficulty in achieving high F-theta correction while reducing all of the other aberrations. Relatively simple systems may provide 0.3% F-theta correction, but more demanding systems require less than 0.1%.

Polygon scanners are also limited to less than 60 degrees scan angle. A large scan angle is desirable because a given line length can then be scanned over a shorter distance. This results in smaller system size, always a desirable design characteristic.

For polygons, scan efficiency is approximately 50%. Scan efficiency or "duty cycle" is the ratio of the "time on" to the "time available" during which a scanner is printing or scanning. A scan efficiency of 50% means that half the light goes unused and that the data rate must be twice what it would be if the efficiency were 100%. This essentially doubles the electronic bandwidth requirement, which may become the limiting factor in achieving higher speed.

Figure 11:
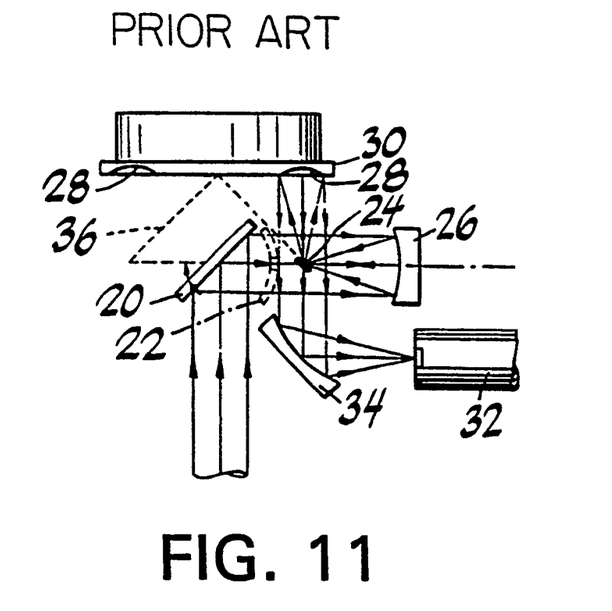
FIG. 11 is a scanner in accordance with U.S. Pat. No. 4,538,181.

A basic compact video rate optical scanner system is described in detail in U.S. Pat. No. 4,538,181 and is shown in FIG. 11. The disclosure of this patent is incorporated herein in its entirety by reference. In this system, incoming radiation from an image is reflected off a framing mirror 20 through a meniscus lens 22, past a strip mirror 24 to an imaging reflector lens 26. The radiation is then focused on strip mirror 24 and reflected toward the concave reflectors 28 of rotating disc 30, from which it emerges as a collimated beam. The collimated beam passes the strip mirror and is focused on detector 32 by means of a collector reflector 34.

The curved strip mirror 24 is the exterior surface of a cone formed with a 45 degree half-angle and an axis which is coaxial with the axis of rotation for disc 30 as indicated by dotted lines 36. Imaging mirror 26 is a concave mirror with a spherical contour having a radius equal to the distance from the vertex of framing mirror 20. The reflected image off mirror 26 lies on a spherical surface which is intercepted by curved strip mirror 24. The radius of curvature of the image is one-half the radius of curvature of imaging mirror 26 and is equal to the scanning disc radius $R_D$.

The scanner described in U.S. Pat. No. 4,538,181, however, suffers from significant limitations preventing its utilization in line printer and scanner applications. The scanner described in U.S. Pat. No. 4,538,181 was developed for infrared applications. Consequently, all lens materials including that of the meniscus lens, were made from material which transmits infrared radiation but not visible light, and are thus is inappropriate for optical line scanner and printer applications in the visual spectrum.

It will also be appreciated that line scanners either read or write lines at finite image distances. The scanner of the '181 patent, however, was developed to read data from a two dimensional scene format located at essentially infinite image distance. Further, the oscillating mirror which scans the vertical dimension in the image format serves no function in a line scanner.

Moreover, since the scanner optics and image are concentric about the center of the aperture stop, the image surface is also inherently concentric and spherical, whereas it is very desirable for the image surface to be flat. For distant images, such as typically found in thermal imaging, the radius of the image sphere is long enough that the depth of focus allows relatively near and far range images to be simultaneously in focus. For very near, flat images, however, such as a film plate or a line along a rotating drum, field curvature is excessive.

Accordingly, there is a need in the art for a high speed optical scanner and printer providing improved performance in image spot size, spot size uniformity, color imaging, line position repeatability, F-theta condition, line generation speed, increased scan angle, and scan efficiency.

SUMMARY OF THE INVENTION

In view of the foregoing, it is an object of the invention to provide an optical scanner and printer for use with images at near distances.

It is a further object of the invention to provide an optical scanner and printer which yields improved imaging performance over previous scanner and printer systems, particularly in regard to low F-theta deviation, field flatness, and uniformity of spot size and shape across the scanned field.

It is a further object of the invention to provide an optical scanner and printer of reduced size and manufacturing cost via the use of mirrors instead of lenses.

It is a further object of the invention to provide an optical scanner which yields a higher data rate due to a aerodynamic high speed scanning disc.

It is a further object of the invention to provide an optical scanner that operates at reduced electronic bandwidth due to its higher scan efficiency.

It is a further object of the invention to provide an optical scanner which employs a field mirror and field strip mirror which provide the optical scanner high imaging performance for finite image distances and a means to access the image with recording media, etc.

It is a further object of the invention to provide a totally reflective optical system which eliminates all chromatic aberrations and permits it to operate in the ultra-violet, visual, infrared and millimeter wave portions of the electromagnetic spectrum.

It is a further object of the invention to provide an optical scanner and printer that is readily adaptable to different product concepts and configurations.

An optical scanner and printer in accordance with the invention includes a scan disc having spherical concave reflectors. Positioned adjacent to the scan disc in the optical path are a corrector lens, a strip mirror, and a primary mirror. Positioned adjacent to an image plane in the optical path are a field mirror and a pick-off mirror.

As a printer, collimated laser light is input to the scanner and is directed onto a scan disc perpendicular to the plane of rotation and covers the area spanned by the strip mirror. When one of the spherical concave reflectors on the rotating disc is centered over one end of the strip mirror, the input light is brought to focus and is redirected to the primary mirror by the strip mirror. The primary mirror forms a distant, magnified image of the light spot after passing through the corrector lens. The corrector lens can be a concentric meniscus lens located on either side of the effective system aperture stop (i.e., at the center of curvature of the primary mirror), or both, depending on the operating f-number at the strip mirror and the required packaging geometry of the system components. The image is intercepted by a field mirror which, in turn, forms a final, slightly demagnified image of the spot. This image is picked out of the incident light beam by a thin pick-off mirror which redirects the light 90° allowing image accessibility.

As a scanner, light emanating from an image is picked up by a thin pick-off mirror which redirects the light 90° to a field mirror. The field mirror forms a distant magnified image after passing through a corrector lens and aperture stop. The image is intercepted by a primary mirror which focuses the intercepted light on a strip mirror which is slanted to reflect the light toward concave reflectors in a scan disc. The light is then reflected downward past the strip mirror in a collimated beam through a collection optic which focuses the light on a detector.

The optical scanner and printer according to the invention has inherent characteristics which enable it to improve performance beyond that now achievable with polygon and other scanning devices. At the same time, it provides the means to reduce system size and manufacturing costs. Further, its configuration can be readily altered to provide new scanning product concepts embodying characteristics beyond those achievable with conventional optical line scanners and printers.

BRIEF DESCRIPTION OF THE DRAWINGS

The accompanying drawings, referred to herein and constituting a part hereof, illustrate a preferred embodiment of the invention, and, together with the description, serve to explain the principles of the invention, wherein.

DETAILED DESCRIPTION OF THE DRAWINGS

The optical system of the invention disclosed herein is equally applicable to use as a line scanner and as a line printer. Each of these applications will be discussed hereinafter.

The optical system of the invention may be used in conjunction with a movable image plane such as are well known in the art. As a scanner, a moving scanning table may be provided to support the image to be scanned. Linear segments of the image are scanned sequentially as the scanning table moves under an illumination source. Similarly, for a printer, the moving scanning table allows linear segments of an image to be printed. One such configuration of a moving scanning table is described in U.S. Pat. No. 4,899,214. It will be appreciated by those skilled in the art that other configurations, such as a rotating drum or moving the line optically while leaving the image stationary, are equally adaptable to the optical system described herein.

An optical printer in accordance with the invention is illustrated in FIGS. 1A-1C and 2. A scan disc 42 is provided having spherical concave reflectors ("dimples") 44. Positioned adjacent to scan disc 42 are corrector ("meniscus") lens 46, strip mirror 48, and primary mirror 50. Positioned adjacent to image plane 56 in the optical path are field mirror 52 and pick-off mirror 54.

Figure 1A:
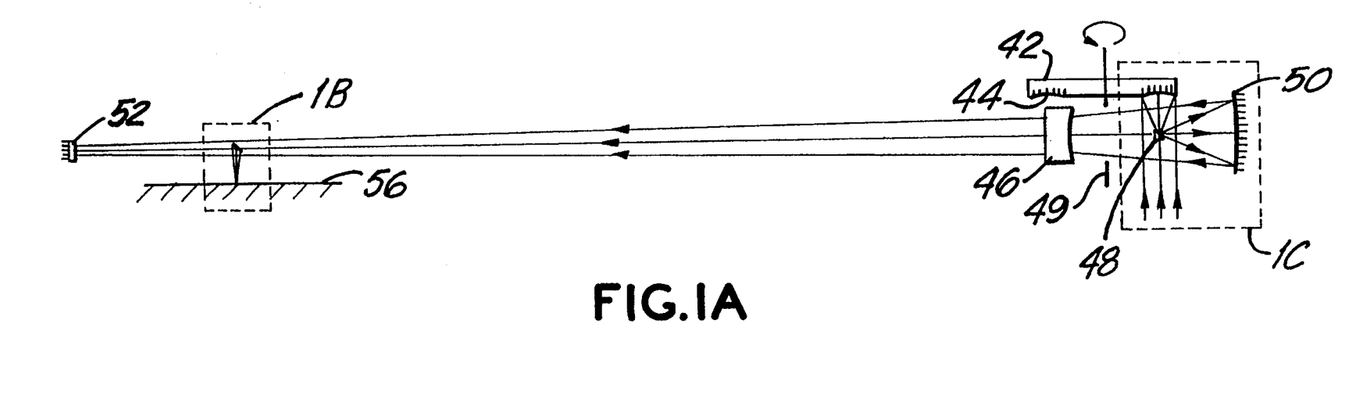
FIG. 1A is an elevation view of an optical printer in accordance with the instant invention.
Figure 1B:
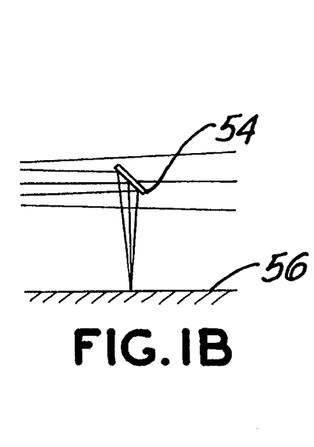
FIG. 1B is a detailed elevation view of the pick-off mirror of the optical printer.
Figure 1C:
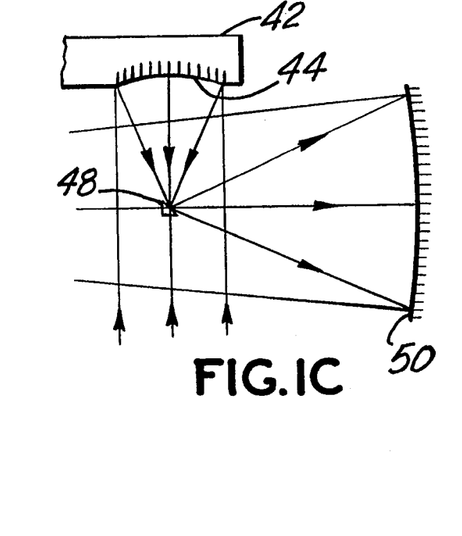
FIG. 1C is a detailed elevation view of the strip mirror of the optical printer.

As may be appreciated from FIGS. 1A-1C, the corrector lens 46 with the strip mirror 48 and a concave reflector 44 are arranged in a configuration with the strip mirror centered on the concave reflectors and corrector lens. Lens systems of this type are known as Bouwers-Maksutov Systems and are described by Kingslake in "Lens Design Fundamentals", Academic Press, 1978, pp. 311–313.

In accordance with the instant invention, collimated laser light is input from a laser-collimating optics assembly (not shown). The laser source is typically either a gas laser operating in the visual spectrum or a solid state laser operating in the near infrared spectrum. In either case, optics are employed to expand and shape the beam for input into the scanner. This may employ anamorphic optics in some cases to achieve the desired beam shape which may be elliptical rather than circular. The collimated input light from a laser or distant point source is directed onto the scan disc 42 perpendicular to the plane of rotation and covers the area spanned by the strip mirror 48 and traversed by the dimple 44. When one of the concave reflectors 44 on the rotating scan disc 42 is centered over one end of the strip mirror, the input light is brought to focus there. The focused light is redirected to the primary mirror 50 by the strip mirror 48. The primary mirror 50 forms a distant, magnified image of the light spot after passing through aperture stop 49 and the corrector lens 46. This image is intercepted by a field mirror 52 which, in turn, forms a final, slightly demagnified image of the spot. This image is picked out of the incident light beam by a thin pick-off mirror 54 which redirects the light 90° to the printing plane 56 allowing image accessibility. It may be appreciated by those skilled in the art that other means (e.g., a conventional beam splitter) may be provided for picking the image out of the incident light beam depending upon the requirements of the particular application.

Figure 3A:
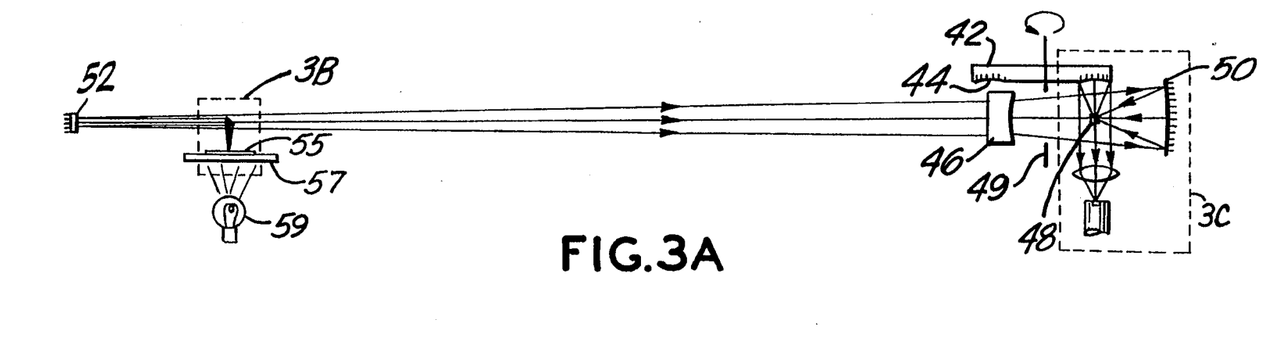
FIG. 3A is an elevation view of an optical scanner in accordance with the instant invention.
Figure 3B:
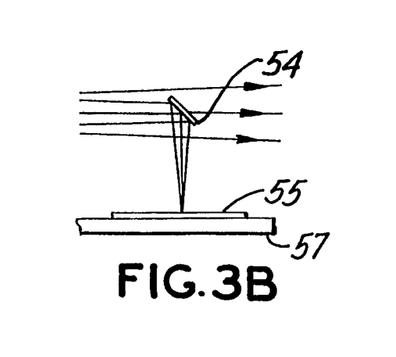
FIG. 3B is a detailed elevation view of the pick-off mirror of the optical scanner.
Figure 3C:
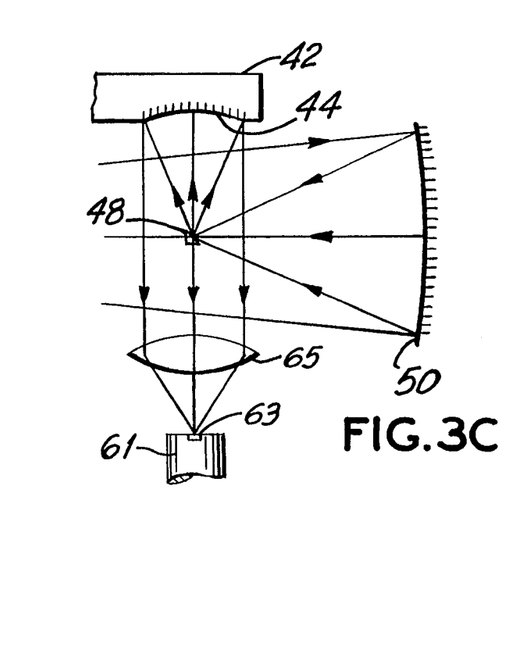
FIG. 3C is a detailed elevation view of the strip mirror of the optical scanner.

An optical scanner in accordance with the invention is illustrated in FIGS. 3A-3C. Those components which are the same as described above with respect to the optical printer are numbered similarly. Scan disk 42 has dimples 44. Positioned adjacent to scan disk 42 are corrector lens 46, strip mirror 48, and primary mirror 50. Positioned adjacent to image plane 56 in the optical path are field mirror 52 and pick-off mirror 54. A film transparency 55, for example, may be supported by transparent plate 57 which is illuminated by light source 59.

In accordance with the instant invention, light emanating from the film transparency is picked up by the thin pick-off mirror 54 which redirects the light at 90° to field mirror 52. Field mirror 52 and corrector lens 46 form a distant demagnified image of the line being scanned. This image is intercepted and further demagnified by primary mirror 50. The primary mirror 50 focuses the intercepted light on strip mirror 48 which is slanted to reflect the light toward the dimples 44 of scan disk 42. Light is reflected upwardly from strip mirror 48 into one of the dimples 44 and then downwardly past the strip mirror in a collimated beam. The collimated beam emerging from the dimple 44 passes through a collection optic 65 (e.g., lens or concave mirror) which focuses the beam onto detector 61 through a pin hole opening 63.

The type of detector used depends on the type of radiation detected and may, for example, be a photoelectric detector that the system operates the visible spectrum. Additionally, the system can be multispectural wherein detectors of different types can be used to simultaneously detect different types of radiation.

The optical system of the present invention, whether applied to a line scanner or to a line printer, provides resolution which is essentially diffraction limited, i.e., the spot size is determined by the optical system relative aperture size and the wavelength of light:

$$d = 2.44 \lambda F$$

where
d = spot diameter at the first ring of an Airy disc
$\lambda$ = wavelength of light
F = f-number of image forming optics This assumes an incident wavefront of constant intensity across the entrance aperture. In a laser printer where the beam intensity is of Gaussian distribution and truncated by the aperture of the input optics at the $1/e^2$ intensity level, the spot size is given by:

$$d = 1.83 \lambda F$$

where d is the diameter of the spot at a 13.5% level. Without truncation of the input Gaussian beam, the spot diameter at any intensity level is broader than an Airy disc (the bright central spot of the diffraction pattern of a lens image of a distant point source) at that relative intensity level. The Gaussian spot size approaches an Airy disc when truncation is at the 50% intensity level. Thus, the spot size can be reduced but only at the expense of lost light.

It may be appreciated that "spot" or "pixel" size is an ambiguous quantity. The intensity level within the Gaussian distribution must be specific in order for the term to be meaningful. The $1/e^2$ intensity level is frequently implied and is used herein.

In line scanner and printer applications, line repeatability and uniformity are very stringent. Line repeatability depends principally on the precision of manufacture and alignment of the scanner or printer hardware. Advantageously, the optical scanner and printer design concept disclosed herein favorably affects the manufacturing and alignment precision, methods, tooling and costs required to achieve the desired scan line repeatability as discussed hereinafter.

Uniformity of line width depends on both design and manufacturing aspects. Spot size and intensity differences across the line result in variable line width. This yields readily discernible copy defects since the eye is remarkably capable of discerning deviations in line parallelism, straightness and spacing which frequently show up as Moire effects. Therefore, uniformity of spot size, shape and intensity are principal design objectives. Optical component misalignment and manufacturing defects can also adversely affect misalignment and must be controlled by a combination of alignment provision and manufacturing precision.

The optical scanner and printer according to the invention employs a concave spherical mirror concentric about an aperture stop. When the image distance is finite, such as in a printer application, the image surface becomes spherical. The image radius (the axial distance from the center of curvature of the primary mirror to the image plane before the field mirror is introduced) is proportional to the mirror radius and is related to the magnification at which the mirror is imaging:

$$R_i = \frac{R_m}{2}\left(\frac{1-m}{m}\right)$$

where
$R_i$ = image radius
$R_m$ = mirror radius
m = magnification

Advantageously, the image curvature caused by the near image distance may be eliminated by introducing an optical component which introduces field curvature of the same amount but of opposite sign. The optical system will then image onto a flat surface at near distance. In accordance with the invention, an optical component which will accomplish this image adjustment is a hyperbolic concave field mirror 52 as shown in FIG. 1A. The radius $R_f$ of the field mirror 52 required to eliminate such image curvature is twice the image radius:

$$R_f = 2R_i$$

If the field mirror is located at the image plane then its affect on image quality other than field curvature will be relatively insignificant. Thus, the field mirror flattens the field while substantially preserving the initial image quality. In actuality, the mirror must be displaced axially from this location by a small amount to yield a real, fully accessible, flat image. The displacement must at least equal the sagittal distance from the tangent plane to the mirror at the edge chief ray point of incidence. This will allow the formation of an image which is real (as opposed to virtual) over the entire image and therefore accessible.

Scanning and printing systems require that the optics meet the F-theta condition. This means that scan line length is proportional to scan angle at all points along the scan line. The scanner imaging onto a spherical surface satisfies the condition exactly:

$$y = R_i \alpha$$

where
y = image length measured on the spherical surface
$R_i$ = image radius
$\alpha$ = scan angle However, for line printer and scanner applications the image must lie on a flat surface. The introduction of optics achieve this without introducing distortion would yield an image height proportional to the tangent of the scan angle and not proportional to the radian value of the angle itself as above:

$$y = R_i \tan \alpha$$

This results in an image which is higher in height than desired when trying to meet the F-theta condition. Introducing negative, i.e., "barrel" distortion causes the image to become lower in height which is desirable.

Introduction of a field mirror in the tangent plane to the image sphere, such that the radius of curvature is twice the radius of curvature of the image sphere, to null the field curvature also introduces third order barrel distortion of a magnitude that results in actual image height y as:

$$y = R_i \tan \alpha [1 - (\tan \alpha)^2/4]$$

The resultant system also exhibits a telocentric characteristic, that is all chief rays emerge from the field mirror parallel because the field mirror focal point is located at the aperture stop, the point from which all chief rays emanate as they propagate to the field mirror.

Telocentricity is desirable because it yields constancy in image plane illuminance, eliminates scale errors due to changing incidence angle, and scale errors due to defocus. When a system is nominally telocentric there is no substantial change in the angle of incidence at the image plane as a function of field position as is ordinarily the case. Therefore, there is no "cos-fourth" or other cosine factor affecting image relative illumination. The ray pencils incident on the image plane are everywhere approximately normal to the surface. The normal ray pencils eliminate the usual cosine factor which affects local image scale. If defocus results from alignment errors or other source, the centroids of the spots remain separated by the same amount as when in focus, preserving image accuracy.

The quantity $1 - (\tan \alpha)^2/4$ in the above equation is the fraction by which the image height is reduced below that of an ordinary lens which is free of distortion. As an example, at a 30 degree scan angle, the ideal F-theta image height is 0.524 $R_i$, the ordinary lens image height is 0.577 $R_i$, and the optical scanner and printer with field mirror is 0.529 $R_i$. Accordingly, at 30 degrees the optical scanner and printer with field mirror achieves the F-theta condition to within 0.5% while an ordinary system yields greater than 5% deviation.

Introduction of a field mirror at the image, therefore, simultaneously yields field curvature correction, F-theta correction and telocentric image formation.

The above discussion of first order optics and third order aberration theory provide a theoretical basis for the optical performance of the optical scanner and printer. A practical system, however, should not permit the field mirror to lie in the image plane. Further, higher order aberrations come into play at large scan angles. Therefore, some modifications to the above-described system are desirable.

A real hyperbolic concave field mirror located in the plane tangent to the image sphere yields a virtual image of unity magnification also located there. The field mirror must be displaced axially inward towards the aperture stop in order for a real, accessible image to be formed on the concave side. The amount of displacement required is such that the image distance as measured from the tangent plane at least equals the sagitta of the field mirror at the point of intersection of the chief ray of the greatest scan angle. Since displacement of the mirror causes it to be used at slightly less than unity magnification, e.g., 0.9, and the image distance conjugate is correspondingly reduced, the required displacement is correspondingly increased.

The axial shift of the field mirror results in departure from the telocentric condition since the distance from the aperture stop to the field mirror is now less than the requisite mirror focal length distance. The exit pupil location in terms of first order optics moves in from its former infinity location and is now located at some distance on the side of the field mirror opposite the aperture stop. The chief rays that are reflected from the field mirror then appear to originate from this distant axial point as they propagate on toward the image plane. The finite slope angle which these rays now have together with the finite distance of the image plane from the mirror and the field mirror magnification factor result in image heights different from those of the case when the field mirror was located at the image sphere tangent plane. The ray slope and image distance factors tend to make the image larger while the magnification factor tends to make the image smaller.

Another factor affecting image height in practical systems is the higher-order spherical aberration which the chief rays of large angles of incidence incur as they are reflected from the field mirror. For a spherical concave mirror, the image chief rays tend to be reflected off the field mirror at an angle which tends to make a smaller image.

A field mirror design variable which gives further control over the height of chief ray intercept at the mirror's surface and the angle of the ray after reflection is asphericity of the surface contour, i.e., departure of the surface from a sphere. Providing the field mirror with an aspheric contour has no effect at small scan angles and a progressively more significant effect at larger scan angles.

The actual base radius, axial location, and aspheric coefficient(s) of the mirror for a particular application are not simply determined by analytical methods. There is no analytical solution which yields perfect field flatness, F-theta correction and telocentricity. Rather, the values of the field mirror variables are chosen after balancing the residual aberrations for a particular scan angle, image cone speed, image scan line length and image spot size requirement. This operation is preferably accomplished using a computer and optical design software such as CODE V of Optical Research Associates of Pasadena, Calif.

In view of the foregoing, it may be appreciated that the field mirror in the optical scanner and printer of the invention accomplishes three important functions: field flattening, telocentricity, and F-theta correction.

Figure 4:
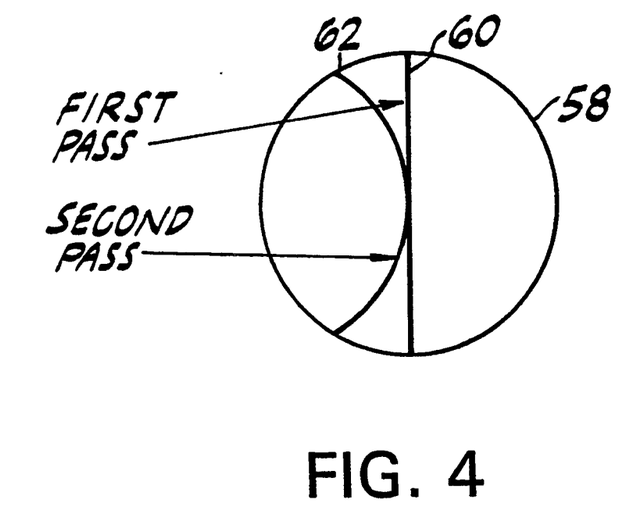
FIG. 4 is an illustration of light beam obscuration in the optical scanner and printer.
Figure 5A:
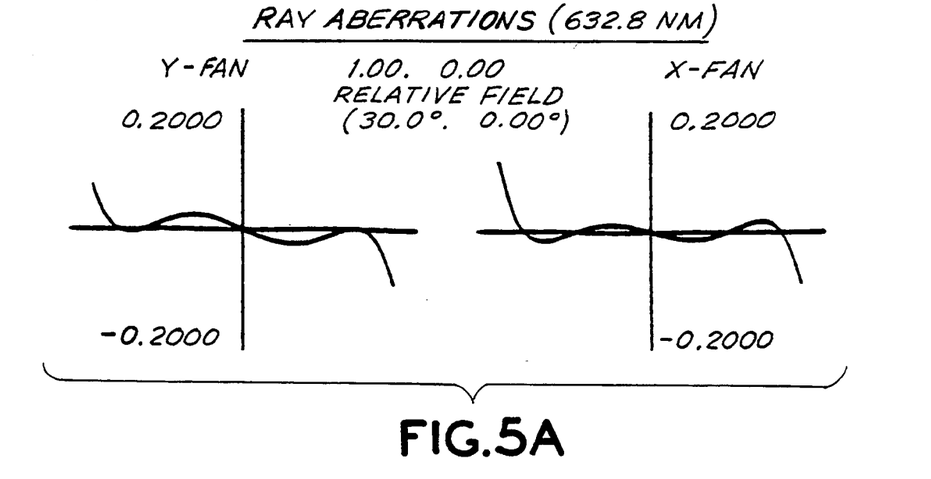
FIGS. 5A-5E are ray aberration plots for the optical scanner and printer.
Figure 5B:
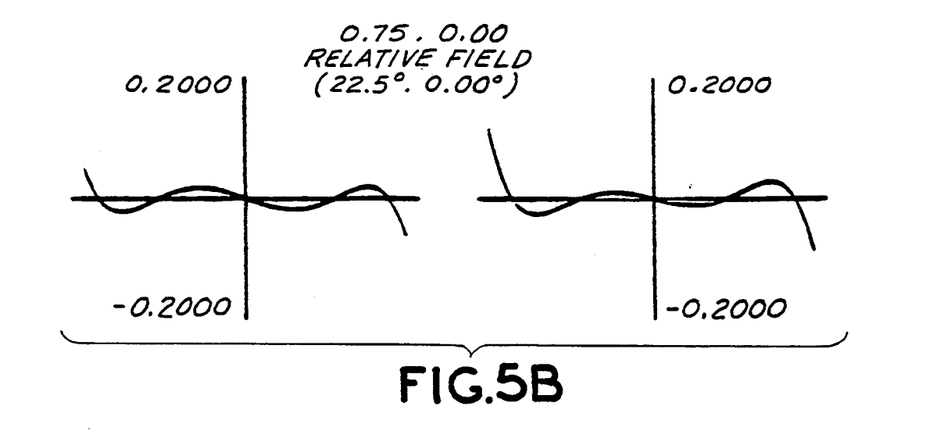
Figure 5C:
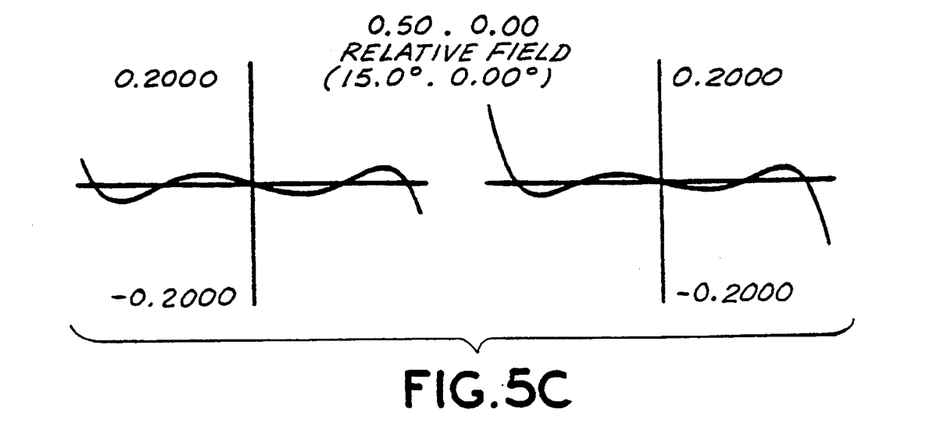
Figure 5D:
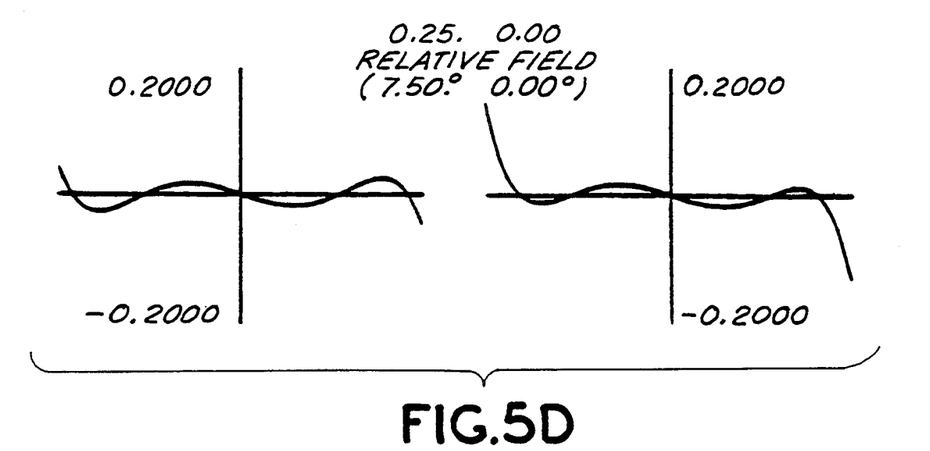
Figure 5E:
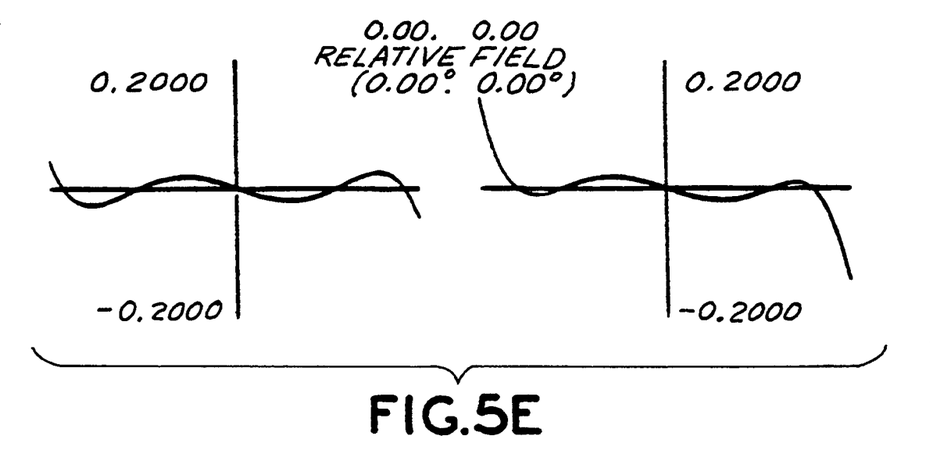
Figure 6A:
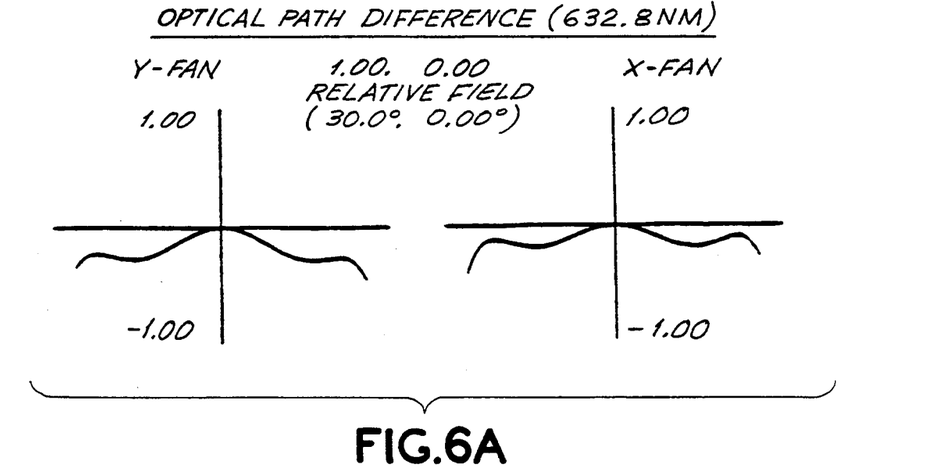
FIGS. 6A-6E are optical path difference plots for the optical scanner and printer.
Figure 6B:
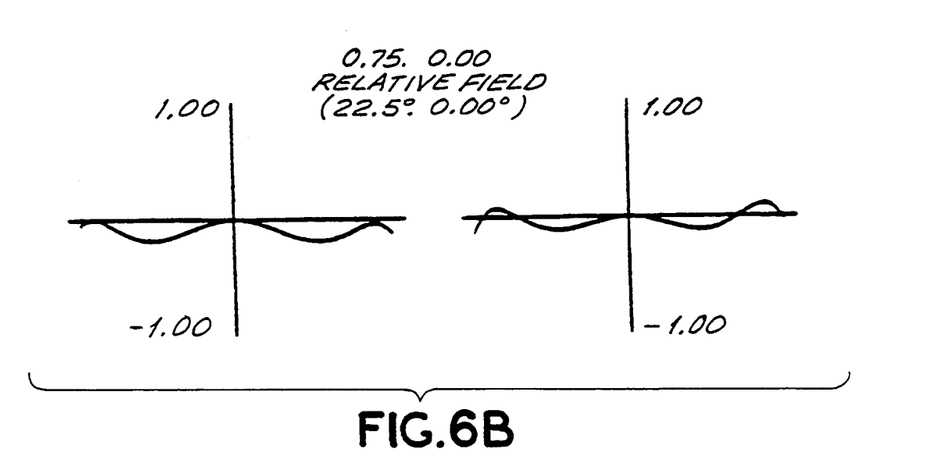
Figure 6C:
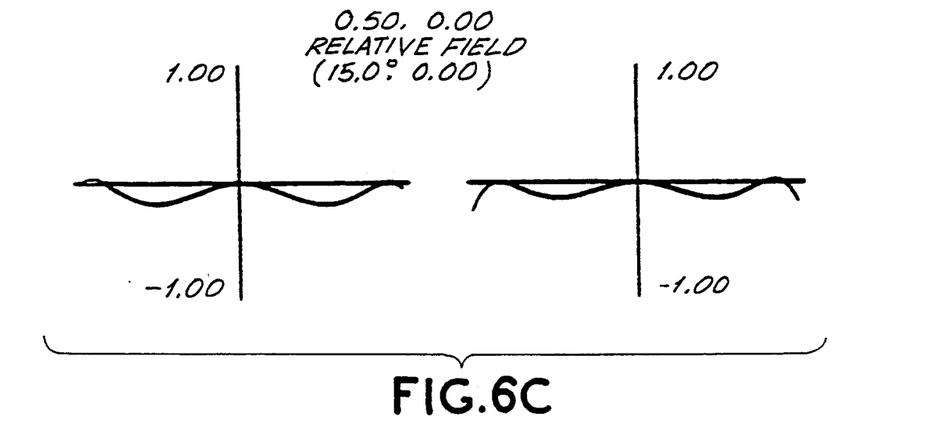
Figure 6D:
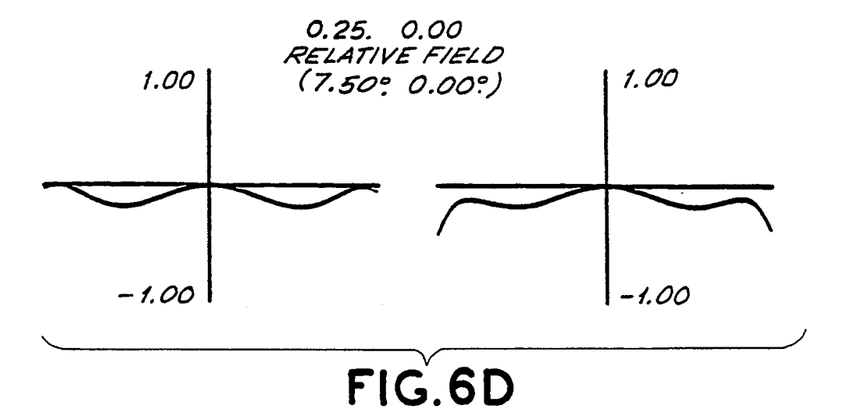
Figure 6E:
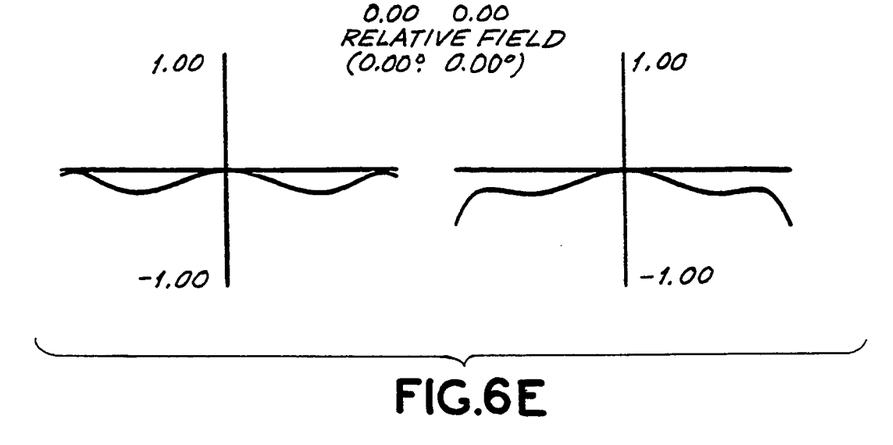

It may be appreciated that the strip mirror 48 is located in the light path thereby obscuring a portion of the light beam 58 as shown in FIG. 4. The minimum obscuration is defined by the diffraction spot size in the vertical direction and the arc length of the strip mirror 48 in the horizontal direction. The area of the beam 58 obscured is typically 5–15%. The diffraction spot size is approximately 1.5 microns.

The total obscuration created by the strip mirror 48 is created in two passes of the light past the strip mirror 48—first, the light beam 58 is partially obscured 60 as it passes on the way to the concave reflector 42, and secondly, the light beam is partially obscured 62 as it passes from the primary mirror 50 to the corrector lens 46.

The pick-off mirror 54 is also located in the light path. It will be appreciated that this potentially introduces further obscuration of the light beam. If the pick-off mirror is thin enough to lie in the shadow of the strip mirror, then no further obscuration is introduced. This is the preferred implementation approach.

The percentage of beam 58 obscured by the pick-off mirror 54 depends on the speed of the image forming cone of light. It may be shown that the minimum obscuration is equal to the slope angle of the marginal ray. For example, an F/25 cone yields a marginal ray angle of $\frac{1}{2}\times$ f-number=0.02 which results in 2 percent obscuration.

The reduction in image plane irradiance is directly proportional to the percentage of light lost due to the beam obscuration. The presence of an obstruction in the beam also introduces diffraction which spreads the radiant energy outward from the core of the light spot. The amount and distribution of the spreading depends on the size of the obscuration and the coherence property of the light. Due to the relatively small size of the strip and pick-off mirror obscuration, serious degradation in the concentration of the energy in the light spot does not occur.

The strip and pick-off mirrors, acting effectively as glare stops, also contribute to reducing the amount of unwanted light that gets to the final image plane. This eliminates pre-exposure and after-exposure of the medium at the final image plane which may otherwise occur due to stray light in the cross scan direction.

In order for a concave reflector to be continually filled with input light as it rotates through the angle of the strip mirror it must be overfilled by the input light. The percentage of light loss due to the overfill condition depends on the scanner configuration, but in general, the wider the scan angle, the lower the efficiency. By designing the input optics to shape the beam to match the envelope swept by the concave reflector, the maximum efficiency can be attained. The form of the optics will depend on the type of light source, but in general will be anamorphic because the swept path is elongated in shape. For a 60° system, approximately 50% efficiency is attainable.

Alternatively, an active beam scanning system with rapid flyback time can be used in the input optics train. In this approach, an input beam diameter no greater than the dimple can be employed. A compromise in scan efficiency results, however, typically of the order of 15%.

If the apertures of the concave reflectors are extended to overlap, then the geometry of the concave reflectors on the face of the scan disc will define a ring of contiguous, sharply defined, keystone shaped sectors; otherwise, there will be an array of circular concave reflector apertures with unused, flat disc area between them. In the overlapping reflectors case, all incident collimated light will be brought to focus by three concave reflectors.

The central concave reflector of the scan disc is always completely filled and transmits the light which ultimately forms the line image. The adjacent concave reflectors, which are partially filled, always focus the unused laser light onto an inactive area of the strip mirror 48 on either side of the active central area. This light may be controlled by applying a black, diffuse, absorptive coating on the strip mirror 48 outside the active area, by allowing the light to be transmitted through the system down to the point of the field mirror 52 which the light will skirt and enter a light trap, or by configuring the surface contour of the strip mirror 48 outside the active area so that the light can be directed immediately to a light trap.

Ideally, the intensity distribution of the input light should be uniform across the beam. The irradiance distribution in the final line image may then be governed entirely by the geometry of the image forming ray bundles at the image plane. If the input beam is non-uniform, a similar non-uniformity will appear in the line image. Intensity non-uniformity in the incident light may also affect the intensity distribution in the focus light spot.

It will be appreciated that the above-described optical components may be utilized whether the system is employed either as a scanner or a printer, i.e., either a read or a write device. The difference between the scanner and the printer occurs in the optics which feed or receive light from the dimple 44 in scanning disc 42.

The optical design and performance specifications for an optical line printer in accordance with the invention are as follows

TABLE 1

| Overall length | 425 mm |
|---|---|
| Scan line length | 400 mm |
| Scan angle | 60° |
| System focal length | 260 mm |
| System F/number | F/25.8 |
| Input laser beam (collimated) | 30 × 10 mm |
| Exit pupil location | infinity |
| Wavelength | 633 nm |
| Spot size | 30μ (1/e² dia) |

Optical design data for the line printer are as follows:

TABLE 2

| Component | Surface Number | Radius (mm) | Thickness (mm) | Medium | Aperture (mm) |
|---|---|---|---|---|---|
| concave reflector | 1 | 25.941 cv | 12.971 | air | 9.9 |
| strip mirror[a] | 2 | 19.335 cx | 28.666 | air | 20 × 0.1 |
| primary mirror | 3 | 48.000 cv | 62.209 | air | 64 × 23 |
| corrector lens | 4 | 14.209 cv | 6.974 | BK7 | 23 × 13 |
|  | 5 | 21.183 cx | 348.523 | air | 31 × 14 |
| field mirror[b] | 6 | 894.860 | 60.000 | air | 402 × 3 |
| pick-off mirror | 7 | infinite | 10.000 | air | 401 × 0.5 |

[a] strip mirror is section from 90° right circular cone
[b] field mirror is aspheric: conic coefficient = 4.6257

The optical performance of the line printer specified in Tables 1 and 2 may be summarized as follows. Residual aberrations cause the light in the focused spot to spread from the diffraction-limited condition, thereby degrading the resolution and modulation transfer function of the system. The transverse ray aberrations for wavelength 632.8 nm are shown in FIGS. 5A-5E. The ray aberration plots of FIGS. 5A-5E were generated using the CODE V program and the system parameters of Table 2. The left and right halves of the plots represent the aberrations in the tangential and sagittal ray fans, respectively. Each set of curves represents a point along the line from the center to the edge, i.e., 30° half-field in 7.5° increments. The aberrations are expressed as the optical path difference across the wavefront are shown in FIGS. 6A-6E. A maximum optical path difference of approximately one-quarter wave exists for nearly all points in the field. This represents a satisfactory degree of correction for many applications.

Figure 7:
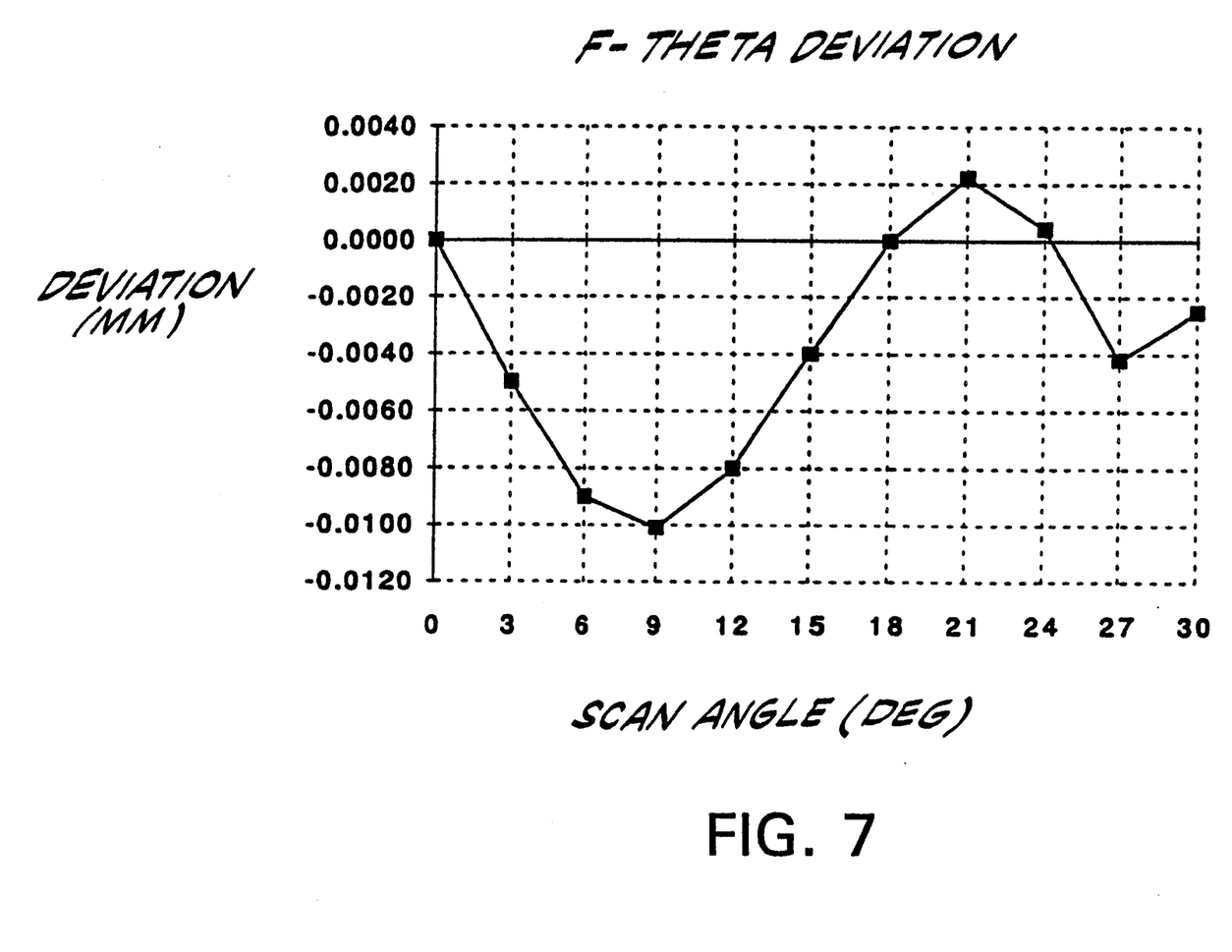
FIG. 7 is an F-Theta deviation plot for the optical scanner and printer.

The deviation from the F-theta condition is plotted in FIG. 7. Evaluation at a relatively large number of field points is made in order to avoid missing points of inflection. The peak-to-peak deviation is 0.012 mm. If the design is modified to achieve better balance among the design variables, namely field mirror curvature, aspheric coefficients and location, the maximum deviation is 0.006 mm at the 9° and 21° points.

Figure 8:
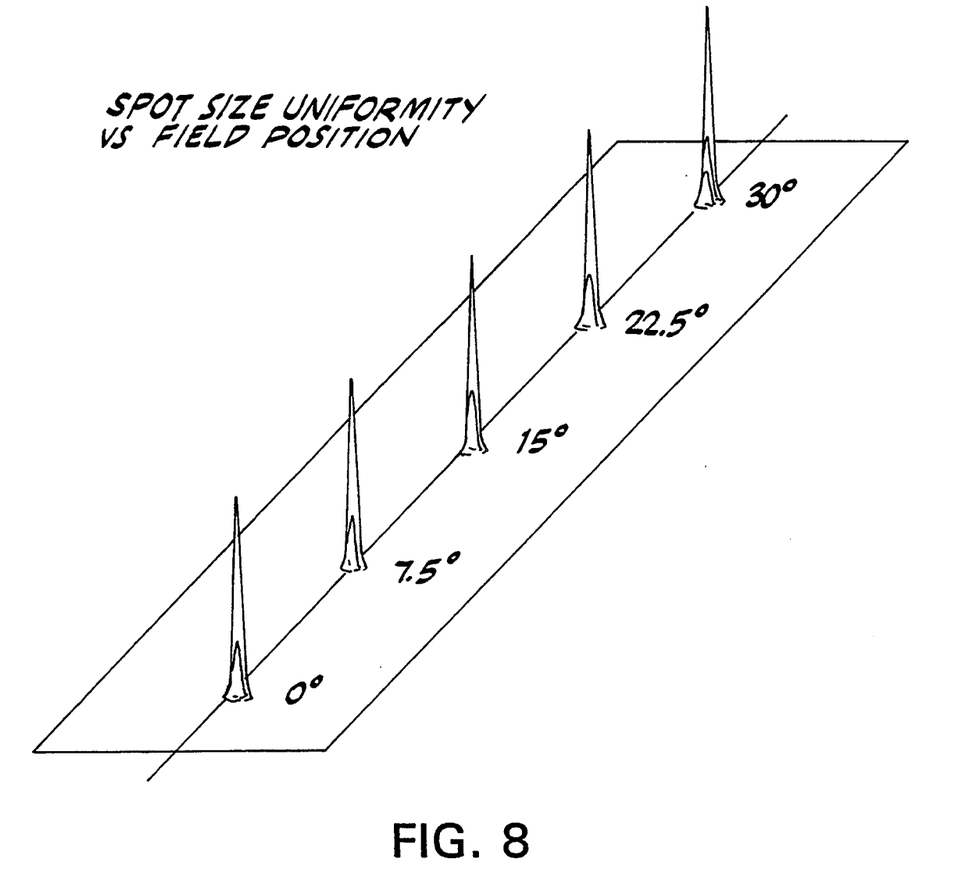
FIG. 8 is a spot iso-intensity plot for the optical scanner and printer.
Figure 9:
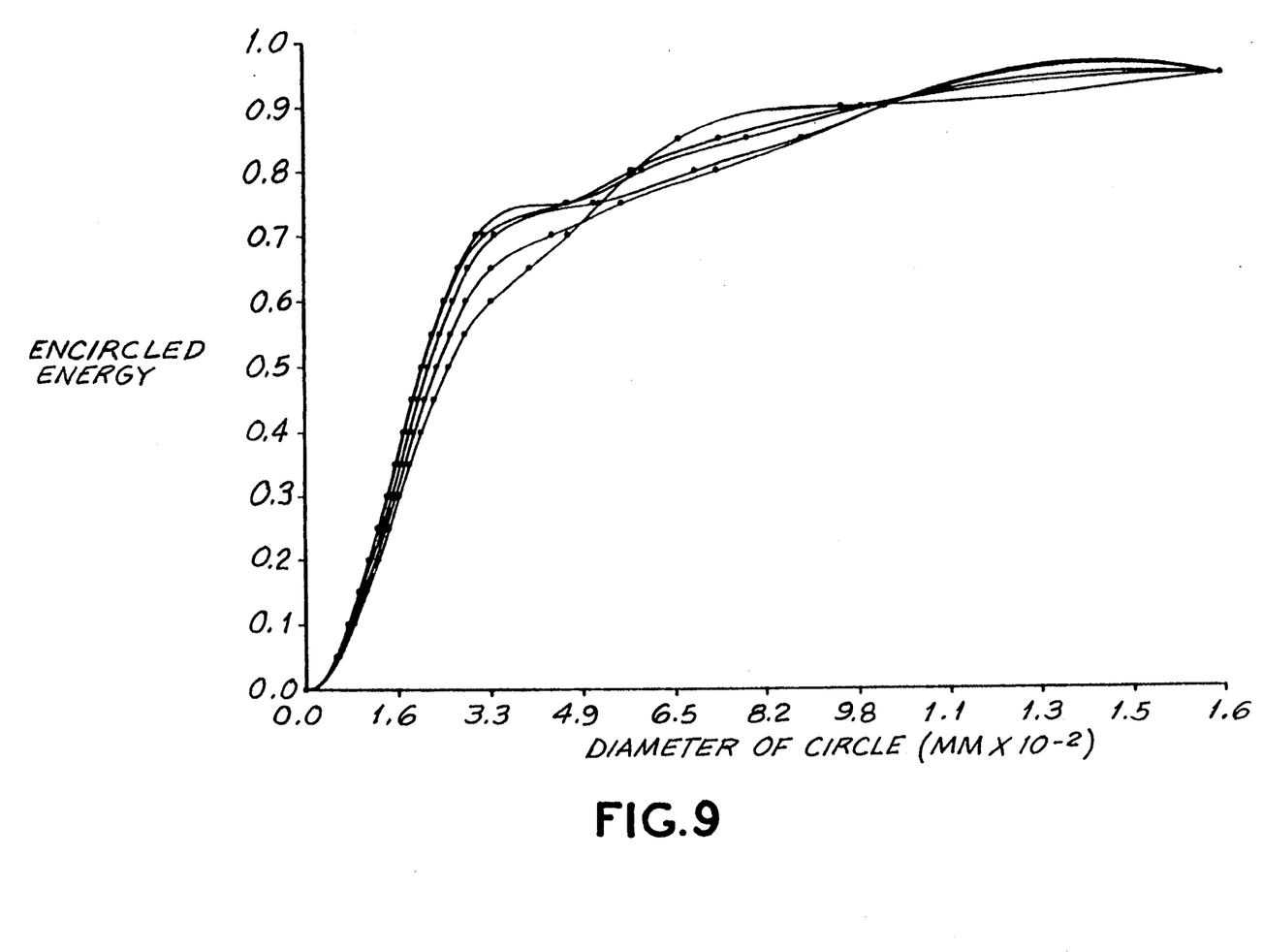
FIG. 9 is a radial energy distribution plot for the optical scanner and printer.

The aberration plots above indicate a high degree of uniformity in the spot intensity distribution for points across the field. This is shown pictorially by the intensity contour plots of FIG. 8 which correspond to the field points in the aberration plots. This information is shown quantitatively in FIG. 9 which presents the radial energy distribution for the same field points.

It may be appreciated that the line scanner of Tables 1 and 2 yields a very high degree of aberration correction and uniformity of the residual aberrations while simultaneously achieving an unusually high degree of correction to meet the F-theta condition. In addition, the system is telocentric contributing significantly to uniformity in spot intensity and insensitivity to focus error. These attributes are due principally to the concentric, symmetric form of the optical scanner and printer and to the application of a field mirror of proper radius, aspheric contour, and location.

For the optical scanner and printer presented, a concentric meniscus lens is used to correct the spherical aberration of the primary mirror and the disc dimple mirror. A problem with this approach is that axial chromatic aberration is introduced. While this is generally of little importance in laser printing systems where the light is monochromatic, in some scanning systems and printing (or projection) systems it is desirable to have full color correction.

As an alternative, the meniscus lens may be removed from the system and the spherical aberration correction is done in the disc dimple by making it an hyperbolic aspheric surface. The spacing between the field mirror and the primary mirror is adjusted to take into account the focusing effect of the meniscus lens. Otherwise, the system is identical to the system with the meniscus lens. As a printer (or projector), light of all colors input to the system as collimated bundles will arrive at precisely the same focal plane. As a scanner, light of all colors originating at the medium at the field mirror will come to the same focal plane at the detector. Color splitting beam splitters may be used in the collimated light space in either the scanning or projection modes to allow parallel acquisition and projection of data.

The optical data for such an optical system appears in Table 3 below. The general requirements are the same as for the optical system with the meniscus lens as presented in Table 1.

TABLE 3

| Component | Surface Number | Radius (mm) | Thickness (mm) | Medium | Aperture (mm) |
| --- | --- | --- | --- | --- | --- |
| concave reflector[a] | 1 | 25.941 cv | 13.251 | air | 10.0 |
| strip mirror[b] | 2 | 19.335 cx | 20.424 | air | 20 × 0.1 |
| primary | 3 | 39.761 cv | 409.164 | air | 56 × 16 |

TABLE 3-continued

| Component | Surface Number | Radius (mm) | Thickness (mm) | Medium | Aperture (mm) |
| --- | --- | --- | --- | --- | --- |
| mirror | | | | | |
| field mirror[c] | 4 | 891.559 | 63.512 | air | 402 × 3 |
| pick-off mirror | 5 | infinite | 10.000 | air | 401 × 0.5 |

[a]concave reflector is aspheric: conic coefficient = −2.4183
[b]strip mirror is section from 90° right circular cone
[c]field mirror is aspheric: conic coefficient = 4.3001

Figures 2, 10:
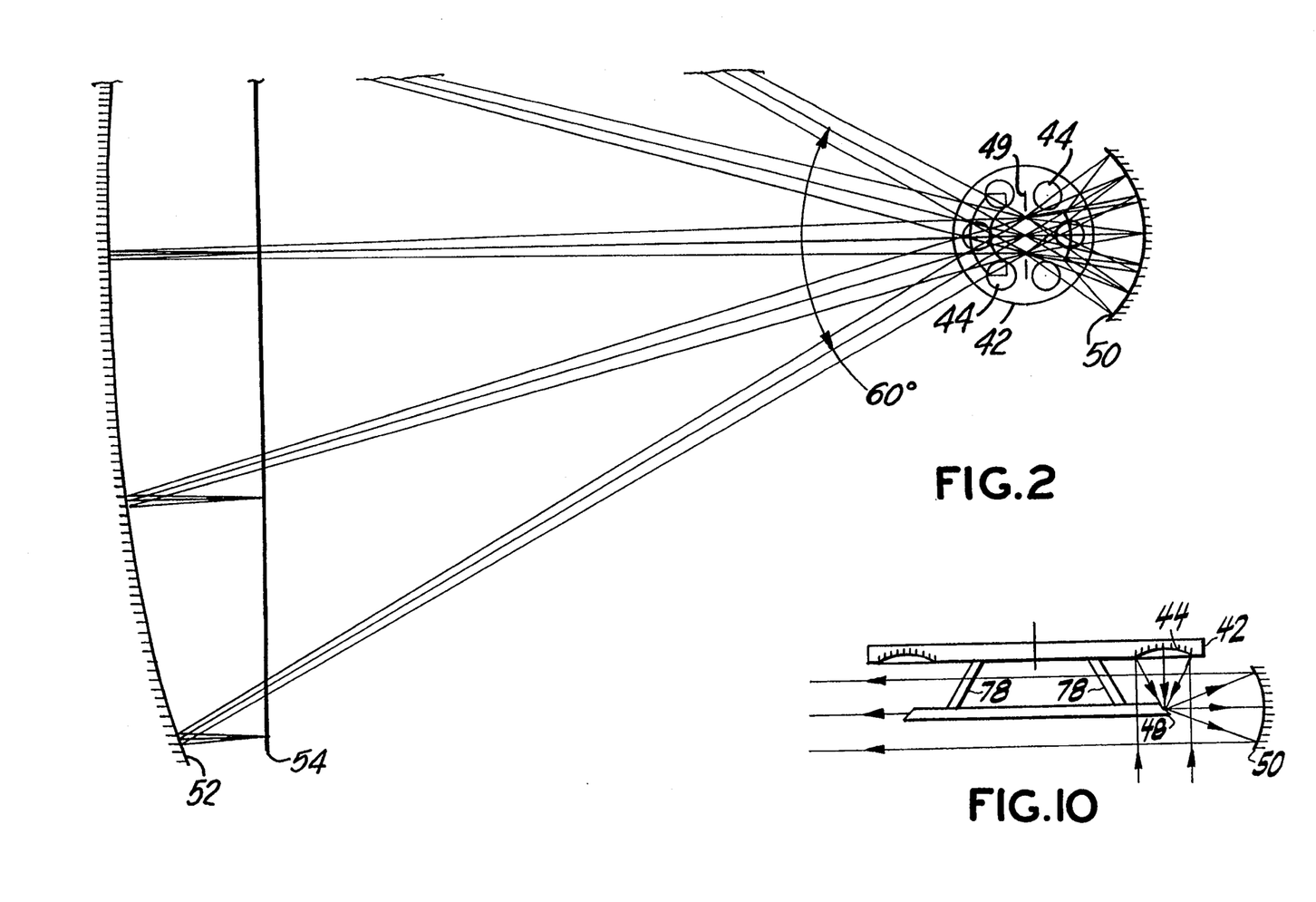
FIG. 2 is a plan view of the optical printer of FIG. 1A.
FIG. 10 illustrates an alternative embodiment of the scan disc and strip mirror in accordance with the instant invention.

The strip mirror 48 may also be fixedly attached to the scan disc 42 as illustrated in FIG. 10 by support members 78. This arrangement generally reduces cross scan errors due to scan disc wobble and eliminates cross scan error when the focal length of the disc dimple is chosen to equal the focal length of the primary mirror. Such errors have been a significant problem in polygon laser beam printer development.

While the invention has been described in its preferred embodiment, it is to be understood that the words which have been used are words of description, rather than limitation, and that changes may be made within the purview of the appended claims without departing from the true scope and the spirit of the invention in its broader aspects.

The function of the field strip mirror can also be performed by other similar optical components. For example, the use of a standard beam splitter in the form of a taut membrane with a coating which partially transmits and reflects light or a conventional beam splitting block of glass, plastic or other refractive material can be used where the light lost by beamsplitting is not of great importance. In another configuration in which the function of the taut reflective band is exactly duplicated, a reflective strip can be embedded in a block of transmitting material. The fabrication of this is similar to that of a beam splitter block except the thin reflective strip is deposited on one of the two surfaces and the two surfaces are then cemented together.

What is claimed:

1. An optical system, comprising:
   a rotating scan disc including a circular array of concave reflectors on a planar surface thereof;
   imaging means adapted to coincide with the scanning sweep of the concave reflectors and separated from said concave reflectors by a distance equal to the focal length of said concave reflectors;
   a light source positioned to emit light toward said circular array of concave reflectors to form an image redirected from said imaging means; and
   image adjustment means for adjusting the curvature of said image.

2. An optical system in accordance with claim 1, wherein said image adjustment means includes a field mirror.

3. An optical system in accordance with claim 2, wherein said field mirror has an aspheric surface.

4. An optical system in accordance with to claim 2, wherein said field mirror is located in proximity to an image plane.

5. An optical system in accordance with claim 4, wherein said field mirror is displaced from the image plane by at least a sagittal distance from a tangent plane to the field mirror at the edge chief ray point of incidence.

6. An optical system in accordance with claim 2, further comprising means for redirecting the image from said field mirror.

7. An optical system, comprising:
a rotating scan disc including a circular array of concave reflectors on a planar surface thereof;
imaging means adapted to coincide with the scanning sweep of the concave reflectors and separated from said concave reflectors by a distance equal to the focal length of said concave reflectors;
a light source positioned to emit light toward said circular array of concave reflectors to form an image redirected from said imaging means;
image adjustment means including a field mirror for adjusting the curvature of said image; and
means for redirecting the image from said field mirror;
wherein said means for redirecting is a pick-off mirror.

8. An optical system, comprising:
a rotating scan disc including a circular array of concave reflectors on a planar surface thereof;
imaging means adapted to coincide with the scanning sweep of the concave reflectors and separated from said concave reflectors by a distance equal to the focal length of said concave reflectors;
a light source positioned to emit light toward said circular array of concave reflectors to form an image redirected from said imaging means; and
image adjustment means for adjusting the curvature of said image;
wherein said concave reflectors have a hyperbolic aspheric surface.

9. An optical system in accordance with claim 8, wherein said image adjustment means includes a field mirror.

10. An optical system in accordance with claim 9, wherein the surface of said field mirror is aspheric.

11. An optical system in accordance with to claim 9, wherein the field mirror is located in proximity to an image plane.

12. An optical system in accordance with claim 11, wherein said field mirror is displaced from the image plane by at least a sagittal distance from a tangent plane to the field mirror at the edge chief ray point of incidence.

13. An optical system in accordance with claim 9, further comprising means for redirecting the image from said field mirror.

14. An optical system in accordance with claim 13, wherein said means for redirecting is a pick-off mirror.

15. An optical system in accordance with claim 14, wherein said light has a maximum optical path difference of approximately one-quarter wave.

16. An optical system in accordance with claim 14, wherein said light has a peak-to-peak deviation from an F-theta condition of approximately 0.012 mm.

17. An optical system, comprising:
a rotating scan disc including a circular array of concave reflectors on a planar surface thereof;
imaging means adapted to coincide with the scanning sweep of the concave reflectors and separated from said concave reflectors by a distance equal to the focal length of said concave reflectors;
a light source positioned to emit light toward said imaging means to form an image redirected from said concave reflectors; and
image adjustment means for adjusting the curvature of said image.

18. An optical system in accordance with claim 17, wherein said image adjustment means includes a field mirror.

19. An optical scanner in accordance with claim 18, wherein said field mirror has an aspheric surface.

20. An optical system in accordance with claim 18, wherein said field mirror is located in proximity to an image plane.

21. An optical system in accordance with claim 20, wherein said field mirror is displaced from the image plane by at least a sagittal distance from a tangent plane to the field mirror at the edge chief ray point of incidence.

22. An optical system in accordance with claim 18, further comprising means for redirecting light from the light source to the field mirror.

23. An optical system in accordance with claim 22, wherein said means for redirecting is a pick-off mirror.

24. An optical system in accordance with claim 17, further comprising means for collecting the light from said concave reflectors.

25. An optical scanner, comprising:
a rotating scan disc including a circular array of concave reflectors on a planar surface thereof;
imaging means adapted to coincide with the scanning sweep of the concave reflectors and separated from said concave reflectors by a distance equal to the focal length of said concave reflectors;
a light source positioned to emit light toward said imaging means to form an image redirected from said concave reflectors; and
image adjustment means for adjusting the curvature of said image;
wherein said concave reflectors have a hyperbolic aspheric surface.

26. An optical system in accordance with claim 25, wherein said image adjustment means includes a field mirror.

27. An optical scanner in accordance with claim 26, wherein said field mirror has an aspheric surface.

28. An optical system in accordance with claim 25, wherein said field mirror is located in proximity to an image plane.

29. An optical system in accordance with claim 28, wherein said field mirror is displaced from the image plane by at least a sagittal distance from a tangent plane to the field mirror at the edge chief ray point of incidence.

30. An optical system in accordance with claim 25, further comprising means for redirecting light from the light source to the field mirror.

31. An optical system in accordance with claim 30, wherein said means for redirecting is a pick-off mirror.

32. An optical system in accordance with claim 25, further comprising means for collecting the light from said concave reflectors.

33. An optical system in accordance with claim 32, wherein said light has a maximum optical path difference of approximately one-quarter wave.

34. An optical system in accordance with claim 32, wherein said light has a peak-to-peak deviation from an F-theta condition of approximately 0.012 mm.

* * * * *